(12) United States Patent
King et al.

(10) Patent No.: US 8,531,710 B2
(45) Date of Patent: Sep. 10, 2013

(54) ASSOCIATION OF A PORTABLE SCANNER WITH INPUT/OUTPUT AND STORAGE DEVICES

(75) Inventors: Martin T. King, Vashon Island, WA (US); Dale L. Grover, Ann Arbor, MI (US); Clifford A. Kushler, Lynnwood, WA (US); James Q. Stafford-Fraser, CambridgeShire (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/195,193

(22) Filed: Aug. 1, 2011

(65) Prior Publication Data

US 2011/0299125 A1  Dec. 8, 2011

Related U.S. Application Data

(63) Continuation of application No. 11/365,983, filed on Feb. 28, 2006, now Pat. No. 7,990,556, which is a continuation-in-part of application No. 11/004,637, (Continued)

(51) Int. Cl.
| | |
|---|---|
| *G06F 3/12* | (2006.01) |
| *G06F 15/16* | (2006.01) |
| *H04N 1/00* | (2006.01) |
| *H04N 1/024* | (2006.01) |
| *H04N 1/04* | (2006.01) |

(52) U.S. Cl.
USPC .......... 358/1.15; 358/402; 358/473; 358/474; 709/228

(58) Field of Classification Search
None
See application file for complete search history.

(56) References Cited

U.S. PATENT DOCUMENTS

| 3,917,317 A | 11/1975 | Ryan |
| 4,065,778 A | 12/1977 | Harvey |

(Continued)

FOREIGN PATENT DOCUMENTS

| EP | 0697793 | 2/1996 |
| EP | 1054335 | 11/2000 |

(Continued)

OTHER PUBLICATIONS

Liddy, Elizabeth, "How a Search Engine Works," InfoToday.com, vol. 9, No. 5, May 2001, pp. 1-7.

(Continued)

*Primary Examiner* — Satwant Singh
(74) *Attorney, Agent, or Firm* — McDonnell Boehnen Hulbert & Berghoff LLP

(57) ABSTRACT

A device identifier is scanned with a portable scanner and communicated to a service provider. The service provider associates the device with the portable scanner. Information is scanned from a printed source and communicated to the service provider and subsequent information is received in response at a device identified by the device identifier. In some embodiments, a communication session identifier is scanned with a portable scanner and communicated to the service provider rather than (or in cooperation with) the device identifier.

18 Claims, 3 Drawing Sheets

Related U.S. Application Data filed on Dec. 3, 2004, now Pat. No. 7,707,039, and a continuation-in-part of application No. 11/097,961, filed on Apr. 1, 2005, now abandoned, and a continuation-in-part of application No. 11/097,093, filed on Apr. 1, 2005, now abandoned, and a continuation-in-part of application No. 11/098,038, filed on Apr. 1, 2005, now Pat. No. 7,599,844, and a continuation-in-part of application No. 11/098,014, filed on Apr. 1, 2005, now Pat. No. 8,019,648, and a continuation-in-part of application No. 11/097,103, filed on Apr. 1, 2005, now Pat. No. 7,596,269, and a continuation-in-part of application No. 11/098,043, filed on Apr. 1, 2005, now abandoned, and a continuation-in-part of application No. 11/097,981, filed on Apr. 1, 2005, now Pat. No. 7,606,741, and a continuation-in-part of application No. 11/097,089, filed on Apr. 1, 2005, now Pat. No. 8,214,387, and a continuation-in-part of application No. 11/097,835, filed on Apr. 1, 2005, now Pat. No. 7,831,912, and a continuation-in-part of application No. 11/098,016, filed on Apr. 1, 2005, now Pat. No. 7,421,155, and a continuation-in-part of application No. 11/097,828, filed on Apr. 1, 2005, now Pat. No. 7,742,953, and a continuation-in-part of application No. 11/097,833, filed on Apr. 1, 2005, and a continuation-in-part of application No. 11/097,836, filed on Apr. 1, 2005, now abandoned, and a continuation-in-part of application No. 11/098,042, filed on Apr. 1, 2005, now Pat. No. 7,593,605, and a continuation-in-part of application No. 11/096,704, filed on Apr. 1, 2005, now Pat. No. 7,599,580, and a continuation-in-part of application No. 11/110,353, filed on Apr. 19, 2005, now Pat. No. 7,702,624, and a continuation-in-part of application No. 11/131,945, filed on May 17, 2005, now Pat. No. 7,818,215, and a continuation-in-part of application No. 11/185,908, filed on Jul. 19, 2005, now abandoned, and a continuation-in-part of application No. 11/208,408, filed on Aug. 18, 2005, now abandoned, and a continuation-in-part of application No. 11/208,457, filed on Aug. 18, 2005, now abandoned, and a continuation-in-part of application No. 11/208,458, filed on Aug. 18, 2005, now Pat. No. 7,437,023, and a continuation-in-part of application No. 11/208,461, filed on Aug. 18, 2005, now Pat. No. 8,005,720, and a continuation-in-part of application No. 11/209,333, filed on Aug. 23, 2005, now abandoned, and a continuation-in-part of application No. 11/210,260, filed on Aug. 23, 2005, now Pat. No. 7,706,611, and a continuation-in-part of application No. 11/236,440, filed on Sep. 27, 2005, now abandoned, and a continuation-in-part of application No. 11/236,330, filed on Sep. 27, 2005, now Pat. No. 7,812,860, and a continuation-in-part of application No. PCT/US2005/011533, filed on Apr. 1, 2005, and a continuation-in-part of application No. PCT/US2005/013586, filed on Apr. 6, 2005, and a continuation-in-part of application No. PCT/US2005/012510, filed on Apr. 12, 2005.

(60) Provisional application No. 60/657,309, filed on Feb. 28, 2005.

(56) References Cited

U.S. PATENT DOCUMENTS

| | | | |
|---|---|---|---|
| 4,135,791 A | 1/1979 | Govignon | |
| 4,358,824 A | 11/1982 | Glickman et al. | |
| 4,553,261 A | 11/1985 | Froessl | |
| 4,903,229 A | 2/1990 | Schmidt et al. | |
| 4,955,693 A | 9/1990 | Bobba | |
| 4,958,379 A | 9/1990 | Yamaguchi et al. | |
| 5,107,256 A | 4/1992 | Ueno et al. | |
| 5,142,161 A | 8/1992 | Brackmann | |
| 5,201,010 A | 4/1993 | Deaton et al. | |
| 5,272,324 A * | 12/1993 | Blevins | 235/462.44 |
| 5,371,348 A | 12/1994 | Kumar et al. | |
| 5,444,779 A | 8/1995 | Daniele | |
| 5,465,353 A | 11/1995 | Hull et al. | |
| 5,500,920 A | 3/1996 | Kupiec | |
| 5,517,331 A | 5/1996 | Murai et al. | |
| 5,522,798 A | 6/1996 | Johnson et al. | |
| 5,532,469 A | 7/1996 | Shepard et al. | |
| 5,602,376 A | 2/1997 | Coleman et al. | |
| 5,624,265 A | 4/1997 | Redford et al. | |
| 5,625,711 A | 4/1997 | Nicholson et al. | |
| 5,680,607 A | 10/1997 | Brueckheimer | |
| 5,708,825 A | 1/1998 | Sotomayor | |
| 5,821,925 A | 10/1998 | Carey et al. | |
| 5,832,528 A | 11/1998 | Kwatinetz et al. | |
| 5,890,147 A | 3/1999 | Peltonen et al. | |
| 5,893,095 A | 4/1999 | Jain et al. | |
| 5,899,700 A | 5/1999 | Williams et al. | |
| 5,913,185 A | 6/1999 | Martino et al. | |
| 5,937,422 A | 8/1999 | Nelson et al. | |
| 5,949,921 A | 9/1999 | Kojima et al. | |
| 5,982,928 A | 11/1999 | Shimada et al. | |
| 5,983,171 A | 11/1999 | Yokoyama et al. | |
| 5,983,295 A | 11/1999 | Cotugno | |
| 6,002,491 A | 12/1999 | Li et al. | |
| 6,009,420 A | 12/1999 | Fagg, III et al. | |
| 6,029,141 A | 2/2000 | Bezos et al. | |
| 6,033,086 A | 3/2000 | Bohn | |
| 6,044,378 A | 3/2000 | Gladney | |
| 6,053,413 A * | 4/2000 | Swift et al. | 235/472.01 |
| 6,055,333 A | 4/2000 | Guzik et al. | |
| 6,075,895 A | 6/2000 | Qiao et al. | |
| 6,094,689 A | 7/2000 | Embry et al. | |
| 6,095,418 A | 8/2000 | Swartz et al. | |
| 6,140,140 A | 10/2000 | Hopper | |
| 6,145,003 A | 11/2000 | Sanu et al. | |
| 6,154,737 A | 11/2000 | Inaba et al. | |
| 6,157,465 A | 12/2000 | Suda et al. | |
| 6,178,261 B1 | 1/2001 | Williams et al. | |
| 6,201,903 B1 | 3/2001 | Wolff et al. | |
| 6,212,299 B1 | 4/2001 | Yuge | |
| 6,265,844 B1 | 7/2001 | Wakefield | |
| 6,314,406 B1 | 11/2001 | O'Hagan et al. | |
| 6,330,976 B1 | 12/2001 | Dymetman et al. | |
| 6,345,104 B1 | 2/2002 | Rhoads | |
| 6,349,308 B1 | 2/2002 | Whang et al. | |
| 6,360,949 B1 | 3/2002 | Shepard et al. | |
| 6,409,401 B1 | 6/2002 | Petteruti et al. | |
| 6,427,032 B1 | 7/2002 | Irons et al. | |
| 6,459,823 B2 | 10/2002 | Altunbasak et al. | |
| 6,466,336 B1 | 10/2002 | Sturgeon et al. | |
| 6,490,553 B2 | 12/2002 | Van Thong et al. | |
| 6,493,707 B1 | 12/2002 | Dey et al. | |
| 6,537,324 B1 | 3/2003 | Tabata et al. | |
| 6,597,812 B1 | 7/2003 | Fallon et al. | |
| 6,611,598 B1 | 8/2003 | Hayosh | |
| 6,616,038 B1 | 9/2003 | Olschafskie et al. | |
| 6,616,047 B2 | 9/2003 | Catan | |
| 6,641,037 B2 | 11/2003 | Williams | |
| 6,643,696 B2 | 11/2003 | Davis et al. | |
| 6,678,687 B2 | 1/2004 | Watanabe et al. | |
| 6,691,107 B1 | 2/2004 | Dockter et al. | |

| Patent No. | Date | Inventor |
|---|---|---|
| 6,741,871 B1 * | 5/2004 | Silverbrook et al. .......... 455/557 |
| 6,745,937 B2 | 6/2004 | Walsh et al. |
| 6,771,283 B2 | 8/2004 | Carro |
| 6,775,422 B1 | 8/2004 | Altman |
| 6,783,071 B2 | 8/2004 | Levine et al. |
| 6,801,658 B2 | 10/2004 | Morita et al. |
| 6,801,907 B1 | 10/2004 | Zagami |
| 6,812,961 B1 | 11/2004 | Parulski et al. |
| 6,820,237 B1 | 11/2004 | Abu-Hakima et al. |
| 6,845,913 B2 | 1/2005 | Madding et al. |
| 6,862,046 B2 * | 3/2005 | Ko ............................... 348/569 |
| 6,877,001 B2 | 4/2005 | Wolf et al. |
| 6,880,124 B1 | 4/2005 | Moore |
| 6,892,264 B2 | 5/2005 | Lamb |
| 6,917,722 B1 | 7/2005 | Bloomfield |
| 6,917,724 B2 | 7/2005 | Seder et al. |
| 6,925,182 B1 | 8/2005 | Epstein |
| 6,952,281 B1 | 10/2005 | Irons et al. |
| 6,957,384 B2 | 10/2005 | Jeffery et al. |
| 6,990,548 B1 | 1/2006 | Kaylor |
| 7,010,616 B2 | 3/2006 | Carlson et al. |
| 7,020,663 B2 | 3/2006 | Hay et al. |
| 7,047,491 B2 | 5/2006 | Schubert et al. |
| 7,058,223 B2 | 6/2006 | Cox |
| 7,062,437 B2 | 6/2006 | Kovales et al. |
| 7,069,272 B2 | 6/2006 | Snyder |
| 7,085,755 B2 | 8/2006 | Bluhm et al. |
| 7,089,330 B1 | 8/2006 | Mason |
| 7,093,759 B2 | 8/2006 | Walsh |
| 7,131,061 B2 | 10/2006 | MacLean et al. |
| 7,133,862 B2 | 11/2006 | Hubert et al. |
| 7,137,077 B2 | 11/2006 | Iwema et al. |
| 7,165,268 B1 | 1/2007 | Moore et al. |
| 7,167,586 B2 | 1/2007 | Braun et al. |
| 7,174,332 B2 | 2/2007 | Baxter et al. |
| 7,181,761 B2 | 2/2007 | Davis et al. |
| 7,185,275 B2 | 2/2007 | Roberts et al. |
| 7,188,307 B2 | 3/2007 | Ohsawa |
| 7,190,480 B2 | 3/2007 | Sturgeon et al. |
| 7,216,121 B2 | 5/2007 | Bachman et al. |
| 7,216,224 B2 | 5/2007 | Lapstun et al. |
| 7,224,480 B2 | 5/2007 | Tanaka et al. |
| 7,225,979 B2 | 6/2007 | Silverbrook et al. |
| 7,239,747 B2 | 7/2007 | Bresler et al. |
| 7,242,492 B2 | 7/2007 | Currans et al. |
| 7,260,534 B2 | 8/2007 | Gandhi et al. |
| 7,262,798 B2 | 8/2007 | Stavely et al. |
| 7,283,992 B2 | 10/2007 | Liu et al. |
| 7,284,192 B2 | 10/2007 | Kashi et al. |
| 7,295,101 B2 | 11/2007 | Ward et al. |
| 7,339,467 B2 | 3/2008 | Lamb |
| 7,362,902 B1 | 4/2008 | Baker et al. |
| 7,376,581 B2 | 5/2008 | DeRose et al. |
| 7,383,263 B2 | 6/2008 | Goger |
| 7,392,287 B2 | 6/2008 | Ratcliff, III |
| 7,392,475 B1 | 6/2008 | Leban et al. |
| 7,404,520 B2 | 7/2008 | Vesuna |
| 7,409,434 B2 | 8/2008 | Lamming et al. |
| 7,412,158 B2 | 8/2008 | Kakkori |
| 7,424,543 B2 | 9/2008 | Rice, III |
| 7,426,486 B2 | 9/2008 | Treibach-Heck et al. |
| 7,433,068 B2 | 10/2008 | Stevens et al. |
| 7,433,893 B2 | 10/2008 | Lowry |
| 7,496,638 B2 | 2/2009 | Philyaw |
| 7,505,956 B2 | 3/2009 | Ibbotson |
| 7,512,254 B2 | 3/2009 | Vollkommer et al. |
| 7,536,547 B2 | 5/2009 | Van Den Tillaart |
| 7,552,075 B1 | 6/2009 | Walsh |
| 7,552,381 B2 | 6/2009 | Barrus |
| 7,561,312 B1 | 7/2009 | Proudfoot et al. |
| 7,574,407 B2 | 8/2009 | Carro et al. |
| 7,587,412 B2 | 9/2009 | Weyl et al. |
| 7,591,597 B2 | 9/2009 | Pasqualini et al. |
| 7,613,634 B2 | 11/2009 | Siegel et al. |
| 7,634,407 B2 | 12/2009 | Chelba et al. |
| 7,634,468 B2 | 12/2009 | Stephan |
| 7,664,734 B2 | 2/2010 | Lawrence et al. |
| 7,689,712 B2 | 3/2010 | Lee et al. |
| 7,689,832 B2 | 3/2010 | Talmor et al. |
| 7,698,344 B2 | 4/2010 | Sareen et al. |
| 7,710,598 B2 | 5/2010 | Harrison, Jr. |
| 7,761,451 B2 | 7/2010 | Cunningham |
| 7,779,002 B1 | 8/2010 | Gomes et al. |
| 7,783,617 B2 | 8/2010 | Lu et al. |
| 7,788,248 B2 | 8/2010 | Forstall et al. |
| 7,796,116 B2 | 9/2010 | Salsman et al. |
| 7,941,433 B2 | 5/2011 | Benson |
| 7,949,191 B1 | 5/2011 | Ramkumar et al. |
| 7,990,556 B2 * | 8/2011 | King et al. .................... 358/1.15 |
| 8,082,258 B2 | 12/2011 | Kumar et al. |
| 8,146,156 B2 | 3/2012 | King et al. |
| 2001/0045463 A1 * | 11/2001 | Madding et al. ......... 235/462.14 |
| 2001/0055411 A1 | 12/2001 | Black |
| 2002/0012065 A1 | 1/2002 | Watanabe |
| 2002/0022993 A1 | 2/2002 | Miller et al. |
| 2002/0023957 A1 | 2/2002 | Michaelis et al. |
| 2002/0054059 A1 | 5/2002 | Schneiderman |
| 2002/0055919 A1 | 5/2002 | Mikheev |
| 2002/0067308 A1 | 6/2002 | Robertson |
| 2002/0073000 A1 | 6/2002 | Sage |
| 2002/0091928 A1 | 7/2002 | Bouchard et al. |
| 2002/0111960 A1 | 8/2002 | Irons et al. |
| 2002/0125411 A1 | 9/2002 | Christy |
| 2002/0154817 A1 | 10/2002 | Katsuyama et al. |
| 2003/0004991 A1 | 1/2003 | Keskar et al. |
| 2003/0019939 A1 | 1/2003 | Sellen |
| 2003/0039411 A1 | 2/2003 | Nada |
| 2003/0043042 A1 | 3/2003 | Moores, Jr. et al. |
| 2003/0081251 A1 * | 5/2003 | Tanaka et al. ................ 358/1.15 |
| 2003/0093400 A1 | 5/2003 | Santosuosso |
| 2003/0093545 A1 | 5/2003 | Liu et al. |
| 2003/0149678 A1 | 8/2003 | Cook |
| 2003/0160975 A1 | 8/2003 | Skurdal et al. |
| 2003/0171910 A1 | 9/2003 | Abir |
| 2003/0173405 A1 | 9/2003 | Wilz, Sr. et al. |
| 2003/0182399 A1 | 9/2003 | Silber |
| 2003/0187751 A1 | 10/2003 | Watson et al. |
| 2003/0195851 A1 | 10/2003 | Ong |
| 2003/0212527 A1 | 11/2003 | Moore et al. |
| 2003/0220835 A1 | 11/2003 | Barnes, Jr. |
| 2003/0223637 A1 | 12/2003 | Simske et al. |
| 2004/0006509 A1 | 1/2004 | Mannik et al. |
| 2004/0006740 A1 | 1/2004 | Krohn et al. |
| 2004/0015437 A1 | 1/2004 | Choi et al. |
| 2004/0023200 A1 | 2/2004 | Blume |
| 2004/0028295 A1 | 2/2004 | Allen et al. |
| 2004/0044627 A1 | 3/2004 | Russell et al. |
| 2004/0139106 A1 | 7/2004 | Bachman et al. |
| 2004/0139107 A1 | 7/2004 | Bachman et al. |
| 2004/0139400 A1 | 7/2004 | Allam et al. |
| 2004/0181688 A1 | 9/2004 | Wittkotter |
| 2004/0189691 A1 | 9/2004 | Jojic et al. |
| 2004/0204953 A1 | 10/2004 | Muir et al. |
| 2004/0205534 A1 | 10/2004 | Koelle |
| 2004/0236791 A1 | 11/2004 | Kinjo |
| 2004/0250201 A1 | 12/2004 | Caspi |
| 2004/0254795 A1 | 12/2004 | Fujii et al. |
| 2004/0268237 A1 | 12/2004 | Jones et al. |
| 2005/0022114 A1 | 1/2005 | Shanahan et al. |
| 2005/0033713 A1 | 2/2005 | Bala et al. |
| 2005/0091578 A1 | 4/2005 | Madan et al. |
| 2005/0097335 A1 | 5/2005 | Shenoy et al. |
| 2005/0108001 A1 | 5/2005 | Aarskog |
| 2005/0108195 A1 | 5/2005 | Yalovsky et al. |
| 2005/0132281 A1 | 6/2005 | Pan et al. |
| 2005/0139649 A1 | 6/2005 | Metcalf et al. |
| 2005/0205671 A1 | 9/2005 | Gelsomini et al. |
| 2005/0214730 A1 | 9/2005 | Rines |
| 2005/0220359 A1 | 10/2005 | Sun et al. |
| 2005/0231746 A1 | 10/2005 | Parry et al. |
| 2005/0251448 A1 | 11/2005 | Gropper |
| 2005/0262058 A1 | 11/2005 | Chandrasekar et al. |
| 2005/0270358 A1 | 12/2005 | Kuchen et al. |
| 2005/0278314 A1 | 12/2005 | Buchheit |
| 2005/0289054 A1 | 12/2005 | Silverbrook et al. |
| 2006/0011728 A1 * | 1/2006 | Frantz et al. ............. 235/462.46 |
| 2006/0048046 A1 | 3/2006 | Joshi et al. |
| 2006/0098899 A1 * | 5/2006 | King et al. .................... 382/305 |

| | | | |
|---|---|---|---|
| 2006/0101285 | A1 | 5/2006 | Chen et al. |
| 2006/0103893 | A1 | 5/2006 | Azimi et al. |
| 2006/0138219 | A1 | 6/2006 | Brzezniak et al. |
| 2006/0146169 | A1 | 7/2006 | Segman |
| 2006/0200780 | A1 | 9/2006 | Iwema et al. |
| 2006/0239579 | A1 | 10/2006 | Ritter |
| 2006/0256371 | A1 | 11/2006 | King et al. |
| 2006/0259783 | A1 | 11/2006 | Work et al. |
| 2006/0266839 | A1 | 11/2006 | Yavid et al. |
| 2006/0283952 | A1 | 12/2006 | Wang |
| 2007/0009245 | A1 | 1/2007 | Ito |
| 2007/0050712 | A1 | 3/2007 | Hull et al. |
| 2007/0173266 | A1 | 7/2007 | Barnes, Jr. |
| 2007/0194119 | A1 | 8/2007 | Vinogradov et al. |
| 2007/0219940 | A1 | 9/2007 | Mueller et al. |
| 2007/0228306 | A1 | 10/2007 | Gannon et al. |
| 2007/0233806 | A1 | 10/2007 | Asadi |
| 2007/0238076 | A1 | 10/2007 | Burstein et al. |
| 2008/0023550 | A1 | 1/2008 | Yu et al. |
| 2008/0072134 | A1 | 3/2008 | Balakrishnan et al. |
| 2008/0082903 | A1 | 4/2008 | McCurdy et al. |
| 2008/0091954 | A1 | 4/2008 | Morris et al. |
| 2008/0093460 | A1* | 4/2008 | Frantz et al. ............ 235/462.46 |
| 2008/0126415 | A1 | 5/2008 | Chaudhury et al. |
| 2008/0170674 | A1 | 7/2008 | Ozden et al. |
| 2008/0172365 | A1 | 7/2008 | Ozden et al. |
| 2008/0195664 | A1 | 8/2008 | Maharajh et al. |
| 2008/0222166 | A1 | 9/2008 | Hultgren et al. |
| 2009/0018990 | A1 | 1/2009 | Moraleda |
| 2009/0247219 | A1 | 10/2009 | Lin et al. |
| 2010/0121848 | A1 | 5/2010 | Yaroslavskiy et al. |
| 2010/0183246 | A1* | 7/2010 | King et al. .................... 382/305 |
| 2010/0185620 | A1 | 7/2010 | Schiller |
| 2011/0072012 | A1 | 3/2011 | Ah-Pine et al. |
| 2011/0085211 | A1* | 4/2011 | King et al. .................... 358/474 |
| 2011/0209191 | A1 | 8/2011 | Shah |
| 2011/0295842 | A1 | 12/2011 | King et al. |
| 2011/0299125 | A1 | 12/2011 | King et al. |

FOREIGN PATENT DOCUMENTS

| | | |
|---|---|---|
| EP | 1087305 | 3/2001 |
| EP | 1318659 | 6/2003 |
| GB | 2 366 033 | 2/2002 |
| JP | H11-213011 | 8/1999 |
| JP | 2001-345710 | 12/2001 |
| JP | 2004-500635 | 1/2004 |
| JP | 2004-050722 | 2/2004 |
| WO | 98/03923 | 1/1998 |
| WO | 00/56055 | 9/2000 |
| WO | 00/67091 | 11/2000 |
| WO | 01/24051 | 4/2001 |
| WO | 02/061730 | 8/2002 |
| WO | 2006/029259 | 3/2006 |

OTHER PUBLICATIONS

Brin et al., "The Anatomy of a Large-Scale Hyper-textual Web Search Engine," Computer Networks and ISDN Systems, Vo. 30, Issue 1-7, Apr. 1, 1998, pp. 1-22.
Bagley, et al., "Editing Images of Text," Communications of the ACM, vol. 37, Issue 12, pp. 63-72 (Dec. 1994).
Brickman et al., "Word Autocorrelation Redundancy Match (WARM) Technology," IBM J. Res. Develop., Nov. 1982, vol. 26, Issue 6, pp. 681-686.
Fehrenbacher, Katie, "Quick Frucall Could Save You Pennies (or $$$)", GigaOM, Jul. 10, 2006, pp. 1-2.
Ghaly et al., "SAMS Teach Yourself EJB in 21 Days," SamsPublishing, 2002-2003 (pp. 1-2, 123 and 135).
Newman et al. "Camworks: A Video-Based Tool for Efficient Capture from Paper Source Documents," Proceedings of the 1999 IEEE International Conference on Multimedia Computing and Systems, vol. 2, pp. 647-653 (1999).
Solutions Software Corp., "Environmental Code of Federal Regulations (CFRs) including TSCA and SARA," Solutions Software Corp., Enterprise, FL Abstract, Apr. 1994, pp. 1-2.
U.S. Precision Lens, "The Handbook of Plastic Optics", pp. 1-145, 1983, 2nd Edition.

U.S. Patent Office, Non-Final Office Action for U.S. Appl. No. 11/004,637 dated Dec. 21, 2007, pp. 1-13.
U.S. Patent Office, Final Office Action for U.S. Appl. No. 11/004,637 dated Oct. 2, 2008, pp. 1-8.
U.S. Patent Office, Non-Final Office Action for U.S. Appl. No. 11/096,704 dated Sep. 10, 2008, pp. 1-15.
U.S. Patent Office, Notice of Allowance for U.S. Appl. No. 11/096,704 dated Mar. 11, 2009, pp. 1-5.
U.S. Patent Office, Non-Final Office Action for U.S. Appl. No. 11/097,089 dated Aug. 13, 2008, pp. 1-12.
U.S. Patent Office, Non-Final Office Action for U.S. Appl. No. 11/097,093 dated Jul. 10, 2007, pp. 1-10.
U.S. Patent Office, Non-Final Office Action for U.S. Appl. No. 11/097,103 dated Jun. 25, 2007, pp. 1-13.
U.S. Patent Office, Non-Final Office Action for U.S. Appl. No. 11/097,103 dated Jan. 28, 2008, pp. 1-13.
U.S. Patent Office, Non-Final Office Action for U.S. Appl. No. 11/097,103 dated Dec. 31, 2008, p. 1-4.
U.S. Patent Office, Final Office Action for U.S. Appl. No. 11/097,828 dated Feb. 4, 2009, pp. 1-8.
U.S. Patent Office, Non-Final Office Action for U.S. Appl. No. 11/097,835 dated Oct. 9, 2007, pp. 1-22.
U.S. Patent Office, Non-Final Office Action for U.S. Appl. No. 11/097,835 dated Feb. 19, 2009, pp. 1-11.
U.S. Patent Office, Final Office Action for U.S. Appl. No. 11/097,836 dated Jan. 6, 2009, pp. 1-27.
U.S. Patent Office, Non-Final Office Action for U.S. Appl. No. 11/097,961 dated Sep. 15, 2008, pp. 1-10.
U.S. Patent Office, Non-Final Office Action for U.S. Appl. No. 11/097,981 dated Jan. 16, 2009, pp. 1-13.
U.S. Patent Office, Final Office Action for U.S. Appl. No. 11/098,014 dated Jan. 23, 2009, pp. 1-8.
U.S. Patent Office, Non-Final Office Action for U.S. Appl. No. 11/098,016 dated Apr. 24, 2007, pp. 1-22.
U.S. Patent Office, Non-Final Office Action for U.S. Appl. No. 11/098,038 dated Aug. 28, 2006, pp. 1-9.
U.S. Patent Office, Final Office Action for U.S. Appl. No. 11/098,038 dated Jun. 7, 2007, pp. 1-10.
U.S. Patent Office, Notice of Allowance for U.S. Appl. No. 11/098,038 dated Mar. 11, 2009, pp. 1-6.
U.S. Patent Office, Non-Final Office Action for U.S. Appl. No. 11/098,042 dated Dec. 5, 2008, pp. 1-10.
U.S. Patent Office, Notice of Allowance for U.S. Appl. No. 11/098,042 dated Apr. 13, 2009, pp. 1-8.
U.S. Patent Office, Non-Final Office Action for U.S. Appl. No. 11/098,043 dated Jul. 23, 2007, pp. 1-31.
U.S. Patent Office, Non-Final Office Action for U.S. Appl. No. 11/098,043 dated Dec. 23, 2008, pp. 1-35.
U.S. Patent Office, Non-Final Office Action for U.S. Appl. No. 11/110,353 dated Jul. 27, 2007, pp. 1-9.
U.S. Patent Office, Final Office Action for U.S. Appl. No. 11/110,353 dated Jan. 6, 2009, pp. 1-9.
U.S. Patent Office, Non-Final Office Action for U.S. Appl. No. 11/131,945 dated Jan. 8, 2009, pp. 1-12.
U.S. Patent Office, Non-Final Office Action for U.S. Appl. No. 11/208,408 dated Oct. 7, 2008, pp. 1-25.
U.S. Patent Office, Non-Final Office Action for U.S. Appl. No. 11/208,457 dated Oct. 9, 2007, pp. 1-18.
U.S. Patent Office, Non-Final Office Action for U.S. Appl. No. 11/208,458 dated Mar. 21, 2007, pp. 1-12.
U.S. Patent Office, Non-Final Office Action for U.S. Appl. No. 11/236,440 dated Jan. 22, 2009, pp. 1-16.
U.S. Patent Office, Notice of Allowance for U.S. Appl. No. 12/542,816 dated Apr. 27, 2011, pp. 1-5.
European Patent Office, European Search Report for EP Application No. 05734996 dated Mar. 23, 2009, pp. 1-3.
European Patent Office, European Search Report for EP Application No. 05735008 dated Feb. 16, 2011, pp. 1-6.
King et al., U.S. Appl. No. 13/186,908, filed Jul. 20, 2011, all pages.
King et al., U.S. Appl. No. 13/253,632, filed Oct. 5, 2011, all pages.
Bahl, et al., "Font Independent Character Recognition by Cryptanalysis," IBM Technical Disclosure Bulletin, vol. 24, No. 3, pp. 1588-1589 (Aug. 1, 1981).

Ramesh, R.S. et al., "An Automated Approach to Solve Simple Substitution Ciphers," Cryptologia, vol. 17. No. 2, pp. 202-218 (1993).

Nagy et al., "Decoding Substitution Ciphers by Means of Word Matching with Application to OCR," IEEE Transactions on Pattern Analysis and Machine Intelligence, vol. 30, No. 5, pp. 710-715 (Sep. 1, 1987).

Wood et al., "Implementing a faster string search algorithm in Ada," CM Sigada Ada Letters, vol. 8, No. 3, pp. 87-97 (Apr. 1, 1988).

Garain et al., "Compression of Scan-Digitized Indian Language Printed Text: A Soft Pattern Matching Technique," Proceedings of the 2003 ACM Symposium on Document Engineering, pp. 185-192 (Jan. 1, 2003).

King et al., U.S. Appl. No. 13/614,770, filed Sep. 13, 2012, 102 pages.

King et al., U.S. Appl. No. 13/614,473, filed Sep. 13, 2012, 120 pages.

King et al., U.S. Appl. No. 13/615,517, filed Sep. 13, 2012, 114 pages.

* cited by examiner

ASSOCIATION OF A PORTABLE SCANNER WITH INPUT/OUTPUT AND STORAGE DEVICES

CROSS-REFERENCE TO RELATED APPLICATIONS

This application is a Continuation-In-Part of the following, each of which is hereby incorporated by reference in its entirety: U.S. patent application Ser. No. 11/004,637 filed on Dec. 3, 2004, U.S. patent application Ser. No. 11/097,961, filed Apr. 1, 2005, entitled METHODS AND SYSTEMS FOR INITIATING APPLICATION PROCESSES BY DATA CAPTURE FROM RENDERED DOCUMENTS, U.S. patent application Ser. No. 11/097,093, filed Apr. 1, 2005, entitled DETERMINING ACTIONS INVOLVING CAPTURED INFORMATION AND ELECTRONIC CONTENT ASSOCIATED WITH RENDERED DOCUMENTS, U.S. patent application Ser. No. 11/098,038, filed Apr. 1, 2005, entitled CONTENT ACCESS WITH HANDHELD DOCUMENT DATA CAPTURE DEVICES, U.S. patent application Ser. No. 11/098,014, filed Apr. 1, 2005, entitled SEARCH ENGINES AND SYSTEMS WITH HANDHELD DOCUMENT DATA CAPTURE DEVICES, U.S. patent application Ser. No. 11/097,103, filed Apr. 1, 2005, entitled TRIGGERING ACTIONS IN RESPONSE TO OPTICALLY OR ACOUSTICALLY CAPTURING KEYWORDS FROM A RENDERED DOCUMENT, U.S. patent application Ser. No. 11/098,043, filed Apr. 1, 2005, entitled SEARCHING AND ACCESSING DOCUMENTS ON PRIVATE NETWORKS FOR USE WITH CAPTURES FROM RENDERED DOCUMENTS, U.S. patent application Ser. No. 11/097,981, filed Apr. 1, 2005, entitled INFORMATION GATHERING SYSTEM AND METHOD, U.S. patent application Ser. No. 11/097,089, filed Apr. 1, 2005, entitled DOCUMENT ENHANCEMENT SYSTEM AND METHOD, U.S. patent application Ser. No. 11/097,835, filed Apr. 1, 2005, entitled PUBLISHING TECHNIQUES FOR ADDING VALUE TO A RENDERED DOCUMENT, U.S. patent application Ser. No. 11/098,016, filed Apr. 1, 2005, entitled ARCHIVE OF TEXT CAPTURES FROM RENDERED DOCUMENTS, U.S. patent application Ser. No. 11/097,828, filed Apr. 1, 2005, entitled ADDING INFORMATION OR FUNCTIONALITY TO A RENDERED DOCUMENT VIA ASSOCIATION WITH AN ELECTRONIC COUNTERPART, U.S. patent application Ser. No. 11/097,833, filed Apr. 1, 2005, entitled AGGREGATE ANALYSIS OF TEXT CAPTURES PERFORMED BY MULTIPLE USERS FROM RENDERED DOCUMENTS, U.S. patent application Ser. No. 11/097,836, filed Apr. 1, 2005, entitled ESTABLISHING AN INTERACTIVE ENVIRONMENT FOR RENDERED DOCUMENTS, U.S. patent application Ser. No. 11/098,042, filed Apr. 1, 2005, entitled DATA CAPTURE FROM RENDERED DOCUMENTS USING HANDHELD DEVICE, U.S. patent application Ser. No. 11/096,704, filed Apr. 1, 2005, entitled CAPTURING TEXT FROM RENDERED DOCUMENTS USING SUPPLEMENTAL INFORMATION, U.S. patent application Ser. No. 11/110,353, filed Apr. 19, 2005, entitled PROCESSING TECHNIQUES FOR VISUAL CAPTURE DATA FROM A RENDERED DOCUMENT, U.S. patent application Ser. No. 11/131,945, filed May 17, 2005, entitled PROCESSING TECHNIQUES FOR TEXT CAPTURE FROM A RENDERED DOCUMENT, U.S. patent application Ser. No. 11/185,908, filed Jul. 19, 2005, entitled AUTOMATIC MODIFICATION OF WEB PAGES, U.S. patent application Ser. No. 11/208,408, filed Aug. 18, 2005, entitled SCANNER HAVING CONNECTED AND UNCONNECTED OPERATIONAL BEHAVIORS, U.S. patent application Ser. No. 11/208,457, filed Aug. 18, 2005, entitled LOCATING ELECTRONIC INSTANCES OF DOCUMENTS BASED ON RENDERED INSTANCES, DOCUMENT FRAGMENT DIGEST GENERATION, AND DIGEST BASED DOCUMENT FRAGMENT DETERMINATION, U.S. patent application Ser. No. 11/208,458, filed Aug. 18, 2005, entitled METHODS, SYSTEMS AND COMPUTER PROGRAM PRODUCTS FOR DATA GATHERING IN A DIGITAL AND HARD COPY DOCUMENT ENVIRONMENT, U.S. patent application Ser. No. 11/208, 461, filed Aug. 18, 2005, entitled APPLYING SCANNED INFORMATION TO IDENTIFY CONTENT, U.S. patent application Ser. No. 11/209,333, filed Aug. 23, 2005, entitled A PORTABLE SCANNING DEVICE, U.S. patent application Ser. No. 11/210,260, filed Aug. 23, 2005, entitled A METHOD AND SYSTEM FOR CHARACTER RECOGNITION, U.S. patent application Ser. No. 11/236,440, filed Sep. 27, 2005, entitled SECURE DATA GATHERING FROM RENDERED DOCUMENTS, U.S. patent application Ser. No, 11/236,330, filed Sep. 27, 2005, entitled HANDHELD DEVICE FOR CAPTURING TEXT FROM BOTH A DOCUMENT PRINTED ON PAPER AND A DOCUMENT DISPLAYED ON A DYNAMIC DISPLAY DEVICE, International Patent Application No. PCT/US05/11533, filed Apr. 1, 2005, entitled A SYSTEM AND METHOD FOR CHARACTER RECOGNITION, International Patent Application No. PCT/US05/13586, filed Apr. 6, 2005, entitled SCANNING APPARATUS AND RELATED TECHNIQUES, International Patent Application No. PCT/US05/12510, filed Apr. 12, 2005, entitled ADDING VALUE TO A RENDERED DOCUMENT.

This application claims priority to, and incorporates by reference in its entirety, the following U.S. Provisional Patent Application: Application No. 60/657,309 filed on Feb. 28, 2005.

This application incorporates by reference in their entirety, the following U.S. Provisional Patent Applications, Application No. 60/604,103 filed on Aug. 23, 2004, Application No. 60/604,098 filed on Aug. 23, 2004, Application No. 60/604, 100 filed on Aug. 23, 2004, Application No. 60/604,102 filed on Aug. 23, 2004, Application No. 60/605,229 filed on Aug. 27, 2004, Application No. 60/605,105 filed on Aug. 27, 2004; Application No. 60/563,520 filed on Apr. 19, 2004, Application No. 60/563,485 filed on Apr. 19, 2004, Application No. 60/564,688 filed on Apr. 23, 2004, Application No. 60/564, 846 filed on Apr. 23, 2004, Application No. 60/566,667 filed on Apr. 30, 2004, Application No. 60/571,381 filed on May 14, 2004, Application No. 60/571,560 filed on May 14, 2004, Application No. 60/571,715 filed on May 17, 2004, Application No. 60/589,203 filed on Jul. 19, 2004, Application No. 60/589,201 filed on Jul. 19, 2004, Application No. 60/589, 202 filed on Jul. 19, 2004, Application No. 60/598,821 filed on Aug. 2, 2004, Application No. 60/602,956 filed on Aug. 18, 2004, Application No. 60/602,925 filed on Aug. 18, 2004, Application No. 60/602,947 filed on Aug. 18, 2004, Application No. 60/602,897 filed on Aug. 18, 2004, Application No. 60/602,896 filed on Aug. 18, 2004, Application No. 60/602, 930 filed on Aug. 18, 2004, Application No. 60/602,898 filed on Aug. 18, 2004, Application No. 60/603,466 filed on Aug. 19, 2004, Application No. 60/603,082 filed on Aug. 19, 2004, Application No. 60/603,081 filed on Aug. 19, 2004, Application No. 60/603,498 filed on Aug. 20, 2004, Application No. 60/603,358 filed on Aug. 20, 2004, Application No. 60/613, 243 filed on Sep. 27, 2004, Application No. 60/613,628 filed on Sep. 27, 2004, Application No. 60/613,632 filed on Sep. 27, 2004, Application No. 60/613,589 filed on Sep. 27, 2004, Application No. 60/613,242 filed on Sep. 27, 2004, Application No. 60/613,602 filed on Sep. 27, 2004, Application No. 60/613,340 filed on Sep. 27, 2004, Application No. 60/613,634 filed on Sep. 27, 2004, Application No. 60/613,461 filed on Sep. 27, 2004, Application No. 60/613,455 filed on Sep. 27, 2004, Application No. 60/613,460 filed on Sep. 27, 2004, Application No. 60/613,400 filed on Sep. 27, 2004, Application No. 60/613,456 filed on Sep. 27, 2004, Application No. 60/613,341 filed on Sep. 27, 2004, Application No. 60/613,361 filed on Sep. 27, 2004, Application No. 60/613,454 filed on Sep. 27, 2004, Application No. 60/613,339 filed on Sep. 27, 2004, Application No. 60/613,633 filed on Sep. 27, 2004, Application No. 60/615,378 filed on Oct. 1, 2004, Application No. 60/615,112 filed on Oct. 1, 2004, Application No. 60/615,538 filed on Oct. 1, 2004, Application No. 60/617,122 filed on Oct. 7, 2004, Application No. 60/622,906 filed on Oct. 28, 2004, Application No. 60/633,452 filed on Dec. 6, 2004, Application No. 60/633,678 filed on Dec. 6, 2004, Application No. 60/633,486 filed on Dec. 6, 2004, Application No. 60/633,453 filed on Dec. 6, 2004, Application No. 60/634,627 filed on Dec. 9, 2004, Application No. 60/634,739 filed on Dec. 9, 2004, Application No. 60/647,684 filed on Jan. 26, 2005, Application No. 60/648,746 filed on Jan. 31, 2005, Application No. 60/653,372 filed on Feb. 15, 2005, Application No. 60/653,663 filed on Feb. 16, 2005, Application No. 60/653,669 filed on Feb. 16, 2005, Application No. 60/653,899 filed on Feb. 16, 2005, Application No. 60/653,679 filed on Feb. 16, 2005, Application No. 60/653,847 filed on Feb. 16, 2005, Application No. 60/654,379 filed on Feb. 17, 2005, Application No. 60/654,368 filed on Feb. 18, 2005, Application No. 60/654,326 filed on Feb. 18, 2005, Application No. 60/654,196 filed on Feb. 18, 2005, Application No. 60/655,279 filed on Feb. 22, 2005, Application No. 60/655,280 filed on Feb. 22, 2005, Application No. 60/655,987 filed on Feb. 22, 2005, Application No. 60/655,697 filed on Feb. 22, 2005, Application No. 60/655,281 filed on Feb. 22, 2005.

TECHNICAL FIELD

The present disclosure relates to scanners, and more particularly to content retrieval that results from scanning.

BACKGROUND

A proliferation of portable scanning devices enables many new applications involving the interaction of the printed and digital world. However, the portability of such devices necessarily involves compromises on the capabilities inherent therein.

SUMMARY

The following summary is intended to highlight and introduce some aspects of the disclosed embodiments, but not to limit the scope of the invention. Thereafter, a detailed description of illustrated embodiments is presented, which will permit one skilled in the relevant art to make and use aspects of the invention. One skilled in the relevant art may obtain a full appreciation of aspects of the invention from the subsequent detailed description, read together with the figures, and from the claims (which follow the detailed description).

In some embodiments, a device identifier is scanned from a device and the device is identified as an associated device of the scanner. A service provider receives a request including scanned information, to associate the portable scanner with the device and identifies the device as an associated device of the portable scanner.

In some embodiments, a service provider receives a device identifier scanned using a portable scanner, and receives additional information scanned using the portable scanner. The service provider identifies a network address of a device identified by the device identifier, and sends content to the network address in response to receiving the additional information scanned using the portable scanner.

In some embodiments, the system associates nearby devices with the user's scanner such that the nearby devices may be used for user input/output (I/O) in response to scans of a printed document. The nearby I/O devices thus become part of the user interface (UI) for the portable scanner. An embodiment of the disclosed innovations may serve as an adaptive distributed user interface for a portable scanning device. Nearby displays, computers, cellphones, printers, public terminals, audio devices (speakers, microphones), etc, may be associated with the user's scanner to provide a flexible user interface that utilizes the I/O devices in its vicinity. Some embodiments of the disclosed innovations may apply nearby I/O devices to enable the delivery of many types of multimedia content (music, video, etc.) that would not normally be suitable for rendering by a small portable device.

In some embodiments, a web browser (or other session-oriented application capable of exchanging information via a network with a server application) is associated with a session ID code displayed on the screen of the device session-oriented application providing the application. The session-oriented application communicates a request for a session ID to the server. The session ID request is correlated with the network address of the device providing the application. The server communicates a unique session ID back to the device providing the application, and records the network address to which the session ID is sent (and with which, therefore, it is associated). The session ID code is scanned from the display of the device using a portable scanner and communicated by the scanner (via its currently active communication channel) to the server, requesting the server to communicate content related to subsequent scans of information to the network address associated with the session ID. Subsequent actions of the portable scanner result in the server retrieving the network address of the session-oriented application previously associated with the session ID and communicating content related to these subsequent actions to the associated network address, where the content is displayed, played, or otherwise rendered (e.g., on a display of the device providing the application).

In some embodiments, information is received about a physical location of a portable scanner. A device near the portable scanner is identified, and the device is identified as an output device for information resulting from actions of the portable scanner. For example, a device is identified from a database of devices previously registered with the server and known to be associated with the owner of the scanner.

In some embodiments, a nearby display is associated with a portable scanner for purposes of delivering information to the user of the portable scanner. To create the association, the user scans a code on the display with the portable scanner. The code may be shown on the display screen or a physical tag, such as a sticker with a barcode. This code and a user identifier are sent to a service provider where the association is recorded in address translation tables or databases. Subsequent information intended for the user is sent to the display until the association is terminated.

BRIEF DESCRIPTION OF THE DRAWINGS

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well known structures and functions have not been shown or described in detail to avoid unnecessarily obscuring the description of the embodiments of the invention. References to "one embodiment" or "an embodiment" do not necessarily refer to the same embodiment, although they may.

Figure 1:
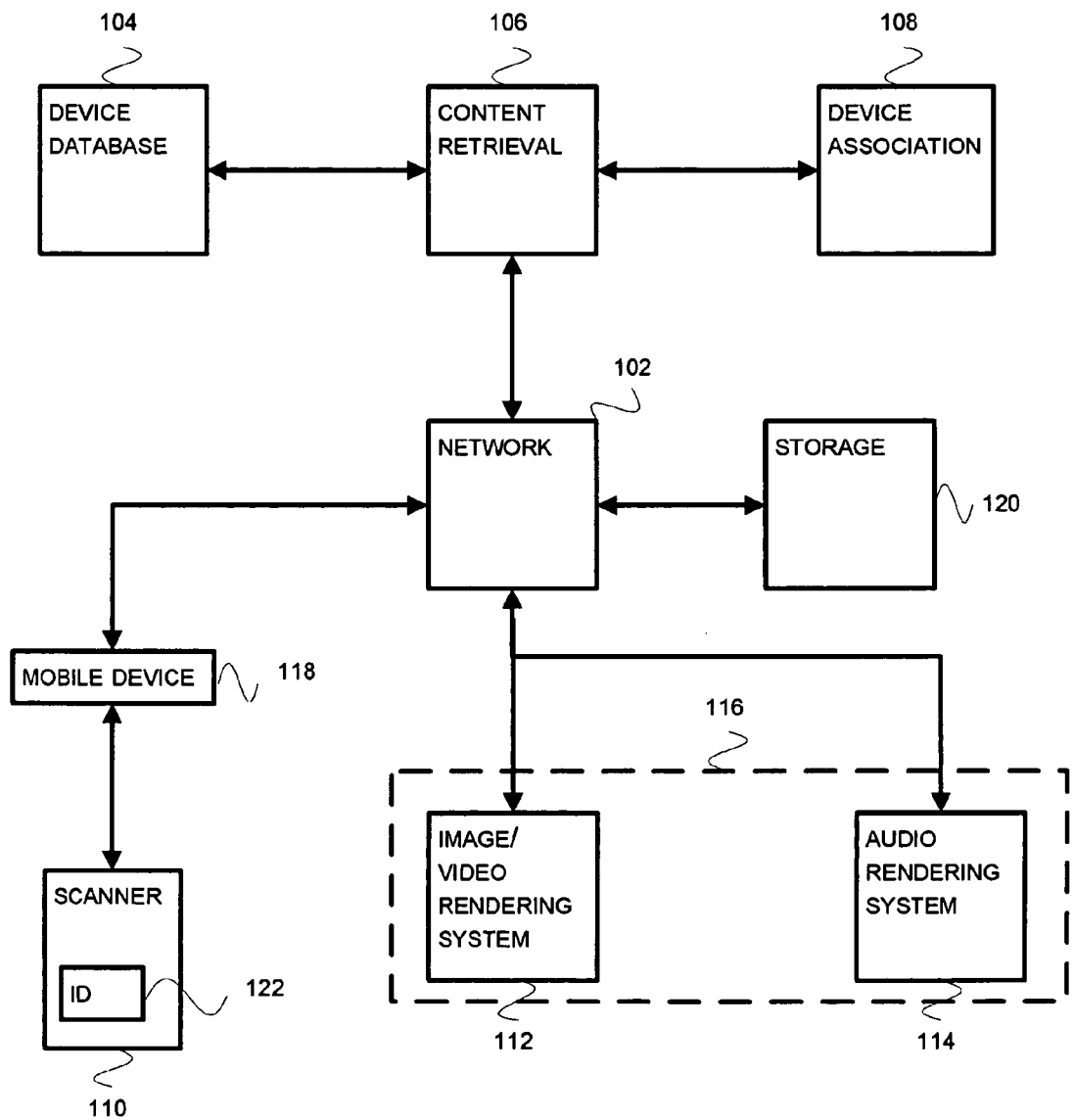
FIG. 1 is a block diagram of an embodiment of a system to associate a scanning device with one or more other devices.

FIG. 1 is a block diagram of an embodiment of a system to associate a scanning device with one or more other devices.

A mobile device 118 may incorporate or interact with a portable scanner function 110. The portable scanner 110, which is a scanner designed for convenient transport by a person, may be a pen-style device, a mouse, a remote control, or a portable phone, to name just a few of the possibilities. The portable scanner 110 may comprise short-range communication capability (e.g., short range RF such as Bluetooth™, short range wire-line such as USB, etc.) which it may use to communicate with the mobile device 118. The scanner includes a user ID code 122 that uniquely identifies the scanner among other such scanners known to the system.

Examples of mobile devices 118 include laptop, notebook, or sub-notebook computers; a hand-held computer such as a personal digital assistant (PDA); or a cellular or other wireless telephone.

Information captured by the portable scanner 110 in one or more scans, possibly along with other information, is communicated to the network 102, from which it is communicated to the content location and retrieval service 106. In some embodiments, this information may initiate a content request/location/retrieval action. The information from at least one of the scans may come from a printed source, for example, a newspaper, magazine, flyer, book, manual, brochure, label, or advertisement. The information from one or more of the scans may also come from electronically or digitally displayed information, for example, text, barcodes, icons, glyphs, or other information from an electronic display.

The mobile device 118 provides longer-range communication capability to the network 102. Examples of such communication comprise the standard public switched telephone network (using a dial-up modem, for example), digital subscriber line, asynchronous digital subscriber line, cable modem, Ethernet, wide-area LAN technology, wireless LAN technology such as IEEE 802.11, and wireless cell phone technology.

The network 102 comprises communication switching, routing, and data storage capabilities. The network 102, inter alia, routes and propagates information between components of the system. The network 102 may comprise the Internet, an intranet or intranets, wire-line and/or wireless network portions.

The device database 104 comprises information about devices that may be associated with the portable scanner 110, and, in some embodiments and/or under some conditions, the mobile device 118. In some embodiments, the device database 104 provides an association of device identifiers with device addresses. The device database 104 may also provide an association of device identifiers with supported content types. Some embodiments of the device database 104 comprise one or more of a relational database, an index, a mapping table, and an enhanced domain name service.

The device association 108 comprises associations between portable scanners and input/output (I/O), storage, or processing devices. In some embodiments the device database 104 and the device association 108 are distinct functions which may be separately accessed by other functions, for example, by content retrieval 106. In some embodiments the device association 108 and the device database 104 may be incorporated into a common functional component.

The content retrieval 106 communicates with the device database 104 and the device association 108 to obtain, inter alia, device information and device association information. In some embodiments the device database 104 and/or the device association 108 may communicate with the content retrieval 106 using a network such as network 102.

The device database 104, the device association 108, and the content retrieval 106 may comprise a "service provider." A service provider is a network-accessible provider of information and/or services in fulfillment of client requests. Service providers may provide subscription-based, advertising supported, pay-per-use, and/or pay-per-transaction access to content and/or communication services.

The content retrieval 106 comprises content location and retrieval functionality. Content is at least one of text, digital sound or music, or one or more digital images or video. The content retrieval 106 locates content corresponding to, related to, and/or identified by information scanned by the portable scanner 110.

The content retrieval 106 communicates with the network 102 and provides the located content to an I/O, storage, or processing device associated with the portable scanner 110.

The associated device may be, inter alia, an image/video rendering system 112 or audio rendering system 114. Some devices (e.g., a combined device 116) may include both audio and imaging/video systems 112 114. Examples of such combination devices 116 include a laptop computer, a desktop computer, televisions, multi-user computer systems, or a kiosk.

Other devices that may be associated with the portable scanner 110 include a data storage device 120 or a printer. Examples of a data storage device 120 comprise a computer hard drive, portable flash storage device, portable music and/or video and/or e-book player (e.g., portable content player), and optical storage media. Computing resources, such as a laptop, desktop, or network-based computer or computers, may also be associated with the portable scanner 110 in order to enhance the processing capabilities associated with the scanner 110.

Identifying a device to which content will be delivered may involve receiving a device identifier for the associated device. The device identifier may be provided by the scanner 110 or mobile device 118 associated with the scanner. Examples of a device identifier are a barcode, unique device serial number, a network address such as an Internet Protocol (IP) address, an alphanumeric code, or a unique device name.

In some embodiments, the network address of the associated device is necessary but an identifier for the associated device is not. The system may function without full knowledge of the capabilities of the associated device in some cases. In other cases, the capabilities may be inferred. For example, if the device requests a communication session identifier via a web browser, and a scanner subsequently submits the communication session identifier to the system, it is likely that the device has a display from which the session identifier was scanned.

In some embodiments, one or more devices are "registered" by the user of a scanner so that they are associated with the unique user (or device) ID that identifies the scanner. For example, a laptop computer that is owned by a user of a scanner may be registered as "Device #1" associated with the scanner's unique user and/or device ID (thus the associated device identifier may be quite simple given the limited number of devices registered by a single user). The associated device may comprise logic that automatically registers its current network address with the service provider (since that network address may frequently change when, for example, a laptop is moved to a new location and establishes a new connection with the Internet). This simplifies the user's task when initiating a new session with the service provider, because the user need only scan the associated device's identifier and automatically communicate a command to the service provider to look up the associated device, retrieve its current network address, and communicate subsequent system responses to the indicated device. Furthermore, the management of the service provider's system is simplified because there is no need to create and maintain a set of identifiers that are unique among all devices known to the service provider. Each user of the service may simply register any devices that are to be used without having to apply for (and subsequently apply) a more-complex device identifier, such as a lengthy serial number.

Furthermore, selecting a device from the small domain of devices associated with a given scanner (and/or user) makes it possible to use alternative methods to identify the desired device. For example, a device may be identified by scanning a selected icon or by performing a distinct gesture with the scanner.

A device identifier may be provided by scanning it and then communicating it to the content location and retrieval 106 (service provider) system. In some embodiments, a device identifier may be made to appear on a visual display of the device so that it may be scanned by the portable scanner 110. The device identifier may be scanned from a serial number affixed to the device, scanned from a barcode affixed to the device, and so on. The identifier of the associated device may be provided with or prior to a content request/location/retrieval action by the scanner 110.

In some embodiments, one or more of the devices that will be associated with a portable scanner 110 will be selected, at least in part, because they are nearby the location of the portable scanner 110. Identifying the location of the portable scanner 110 may occur, at least in part, using GPS satellite location information, information triangulated using multiple RF transceivers, and/or location of Wi-Fi or other wireless access points used by or nearby to the portable scanner 110.

In some embodiments, one or more associated devices may be selected or not selected at least in part by examining characteristics of the located content type (for example, is it text, video, or audio) and determining whether a candidate nearby device supports rendering of that content type.

In some embodiments, the device identifier for the associated device is used, at least in part, to identify the network address of the associated device. The device identifier may be a unique ID that distinguishes the device from all other devices known to the system, or it may be an identifier that, in combination with the unique user and/or device ID 122 associated with the scanner 110, serves to uniquely identify the device to the system. The network address may comprise, among other possibilities, an IP address, a MAC address, a Uniform Resource Locator, or a device name or identifier which is recognized by the network 102 as being a particular device to which information may be sent.

Delivering the located content to the associated device may comprise configuring the associated device for exclusive use by a person using the portable scanner 110 for as long as the portable scanner 110 is associated with the device. Configuring the associated device for exclusive access by the person using the scanner 110 may be particularly important in public or semi-public environments.

The portable scanner 110 and/or associated mobile device 118 may be provided with access to information for which access is controlled by the associated I/O or storage device. Examples of such information are information to enable and/or facilitate functionality of the scanner 110, possibly including keyword definitions, document indexes, tables and parameters to facilitate OCR and/or voice recognition.

Figure 2:
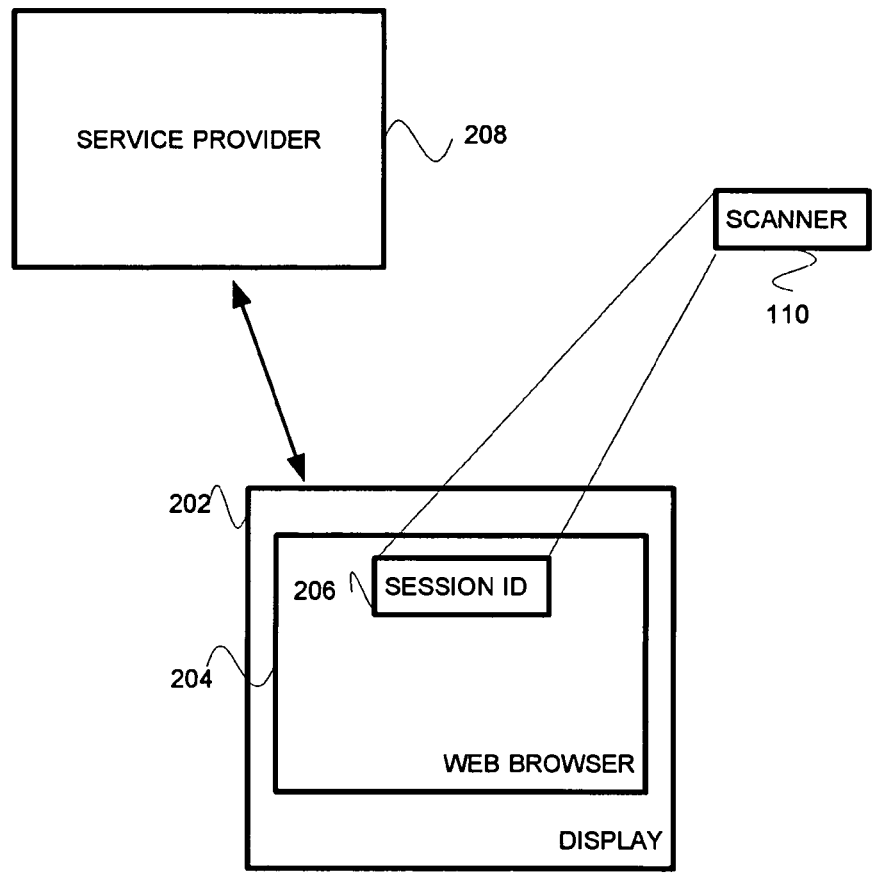
FIG. 2 is a block diagram of an embodiment of a system to associate a browsing session with a scanning device.

FIG. 2 is a block diagram of an embodiment of a system to associate a query session between a scanning device and a service provider. In this example, the session-oriented application comprises a web browser.

A portable scanner 110 interacts with and captures information from a computer system comprising a display 202. Examples of the computer system include a desktop, laptop, or handheld computer, a PDA, or a cellular or other wireless phone. The computer system comprises web browser 204 logic. The web browser 204 typically communicates via a network with a server. The server may comprise, inter alia, a web server, CGI script server, a private network (intranet) server, or a server of a wire-line or wireless telephone support network.

A web browsing session may be characterized by a session identifier (session ID 206). The session ID 206 is a code that uniquely identifies a browser communication session. Examples of session ids 206 are HTTP session IDs as well as other protocol session IDs. In some embodiments, when the web browser 204 is directed to load a web page from a URL designating a web site belonging to service provider 208, the service provider 208 records the network address associated with the request from the web browser 204, and returns a web page on which is displayed a unique session ID code 206. The service provider 208 records (for example, in device association database 108) the association between the unique session ID code 206 and the network address of the device providing the web browser 204 application.

The session identifier 206 may be displayed to a user of the browser 204. Specific functionality may be provided to the web browser 204 so that the session identifier 206 may be displayed. The portable scanner 110 may scan the displayed session ID 206 code. The scanner 110 communicates the scanned unique session ID code 206 to the service provider 208, together with the unique scanner and/or user ID 122, using any of the one or more network communication channels by which the scanner 110 communicates with the service provider 208. This may comprise a request to the service provider 208 to initiate a query session. Responses to subsequent scans (e.g., subsequent queries) are communicated to the web browser 204 at the network address previously associated with session ID 206. In some embodiments, the system may respond with a query session initiation request acknowledgement that may be displayed on web browser 204 confirming to the user that the system has correctly identified the user and his intention to initiate a query session via associated the device 202. When the user finishes a query session, for example, an "end session" icon or command may be scanned from the display of the associated device 202 and communicated to the service provider 208 to terminate the current session. The service provider 208 may then communicate a command to the web browser 204 to clear the display (removing any potentially sensitive information previously displayed in the session) and display a new unique session ID code 206 that may be scanned to initiate a new query session. Similarly, after a pre-determined time interval during which no communication is received by the service provider 208 from the scanner 110, the session may automatically time-out and be similarly terminated.

Subsequent to communicating a query session initiation request, the portable scanner 110 may scan information from a printed source. The scanned information may include text, a barcode, glyph, and/or other identifier of a printed source. The scanned information may include a product name, barcode, company name, logo, trademark, or other identifier of a product. The scanned information may include song name, artist name, anthology name, and/or other identifier of musical content. The scanned information may include an image name, caption, heading, and/or other identifier of image content, or a movie name, actor name, producer name, director name, studio name, product name, or other identifier of video content.

Information captured by the at least one scans (including the scanned session ID 206), with possibly additional information, may be incorporated in a content request. The scanned information may be communicated to a service provider 208 in one or more communications. The service provider 208 may apply the session ID code 206 to, at least in part, direct content back to the web browser 204. This may result in the web browser 204 receiving content communicated as a result of actions of the portable scanner 110.

Content communicated may include an electronic version of a printed document from which information was scanned, digital music associated with information of a scan, a digital voice recording, audio news or commentary, audio product information, or other recorded or synthesized sound, at least one of digital image, digital photo, product image or video, video of news reports or commentary, or other digital images or video.

Figure 3:
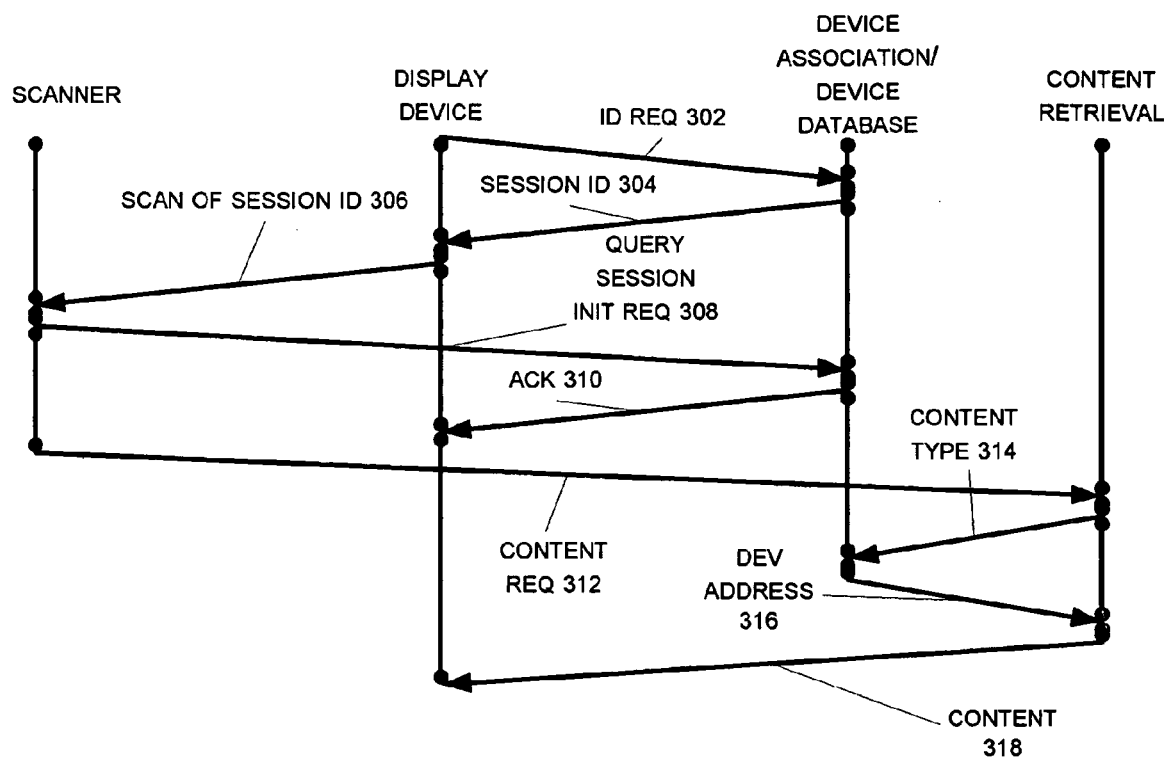
FIG. 3 is an action flow diagram of an embodiment of a process of providing content to a scanner-associated device.

FIG. 3 is an action flow diagram of an embodiment of a process of providing content to a scanner-associated device.

At 302 a display device comprising web browser logic communicates a request to the service provider (e.g., a system comprising the device association and/or device database) to generate a unique session ID code, which is recorded in the device association database along with a network address associated with the browser. At 304, a unique session ID is generated and communicated back to the browser at its associated network address. At 306, the unique session ID is scanned from its displayed location, and at 308 a query session initiation request is communicated to the service provider that includes both the unique user and/or scanner ID and the unique session ID code. The service provider applies the unique session ID code contained in the request 308 to identify the network address recorded in the device association database, and a query session acknowledgement is communicated at 310 to the device at the identified network address. The browser displays the query session request acknowledgement to the user of the scanner. The service provider also records, in the device association database, that the unique session ID is now "owned" by the user of the scanner, e.g., that other portable scanning devices may not become associated with this session ID. The service provider associates the unique user and/or scanner ID with the currently active session ID code and the associated network address.

At 312 the scanner communicates scanned information (REQ) to the content retrieval function. Content retrieval determines content to provide in response to the scanned information.

In some embodiments, the type of the content is communicated to the device database at 314. Content type may be used, at least in part, in determining which associated device or devices is most suited to render the content when more than one device is currently actively associated with scanner. When content is identified for which no currently available device is suitable, a link to such content or the content itself may be stored in a database, emailed to a predetermined address for the user, or otherwise retained, so that such content may be accessed at a later time when an appropriate rendering device is available.

At 316 the device database communicates an associated device address or addresses, or a network address or addresses, to content retrieval. At 318 content retrieval provides the content to the associated device.

In some embodiments, the system may associate storage devices with the user's scanner for the purpose of storing electronic content (audio, video, digital documents, etc.) delivered by the system in response to a scan of a printed document. For instance, by scanning an identifier that uniquely identifies a device having storage capability (such as a computer with a hard drive, writable DVD, CD-ROM, etc.), the system may modify its databases so that future deliveries of content in response to scans of printed documents (originating from the portable scanner) will be delivered to the corresponding storage device and archived for later retrieval.

In some embodiments, the system determines the user's location and which nearby devices may be associated with the user's portable electronic device. The system may determine the user's location by way of on-board GPS in portable device, by triangulation of wireless signals, by determining the location of the communication network transceiver serving the device, by querying the user, or any other suitable method.

In some embodiments, the system maintains a device database that has location information for I/O devices that may be used in conjunction with a portable scanning device. When the system receives a request from a portable scanner for association with an I/O device, the system determines the location of the portable scanner and then identifies appropriate candidates by referring to the device database.

In some embodiments, the user may preset the associations of devices with the portable scanner. As one example, the user may want to have his home computer designated as the recipient for content requests that originate from his scanner. To accomplish this, the user may access the service provider's website and manually enter identifiers of the devices and data repositories (e.g., the home computer) that are to receive responses to his scanned queries. Alternatively, the recipient devices may be automatically identified by the various scanning methods discussed throughout this document.

In some embodiments, a public kiosk displays a dynamic session ID. The kiosk is connected to a communication network such as the Internet or a corporate intranet. The connection may be via cable modem, telephone system (PSTN, ADSL, DSL, etc), wireless local area network (WLAN, IEEE802.11, etc.) or any other suitable access method. The session ID changes periodically but at least every time that the kiosk is used so that a new session ID is displayed to every new user. To use the kiosk, the user scans in the session ID displayed by the kiosk; by scanning the session ID, the user informs the system that he wishes to temporarily associate the kiosk with his scanner for the delivery of content resulting from scans of printed documents. The scanner may communicate the session ID and other information authenticating the scanner (such as a serial number, account number, or other identifying information) directly to the system (perhaps via a wireless communication such as a cellular Short Message Service (SMS) message) or by using the kiosk's links to the communication network. For example, the scanner may apply the kiosk's communication link by transferring the session initiation information to the kiosk (perhaps via short range RF such as BlueTooth™, etc.). The kiosk communicate then communicates the session initiation information to the service provider's system via its Internet connection. The scanner may communicate directly (where "directly" means without passing the message through the kiosk) with the service provider's system by communicating the session initiation message through the user's cellphone (which may be paired with the user's scanner via Bluetooth) or other wireless communication device.

In some embodiments, the system may prevent others from using a device associated with a scanner during the period (session) in which the device is associated with the scanner. This feature is especially useful to prevent others from using a public kiosk before a previous session has ended. As an example of this concept related to use of a computer at an internet café, the user may initiate the session by scanning the session ID from the kiosk display (or entering it via a keypad or touchscreen on the portable scanner); and the system associates in its databases the session ID with the serial number (or other identifier that uniquely identifies the user and/or the user's scanner) of his scanner so another scanner cannot scan the session ID and use the kiosk during his session. The scanner may be in communication (through wireless link such as Bluetooth™, a hardwired link such as a docking station, etc.) with a computer associated with the display or may be in direct (i.e., without going through the computer) communication with the service provider's system via another means such as cellular, etc.

In some embodiments, a portable scanner's functions may vary depending upon the associated devices. For example, if a portable scanner is associated with a nearby computer that has optical character recognition (OCR) capability, the scanner may communicate scanned image data to the computer, whereas if the associated computer did not have OCR capability, the portable scanner may apply an on-board OCR function to convert the scanned images to text before communicating the text to the service provider.

In some embodiments, the scanner may obtain the communication session identifier from the computer by wireless communications (e.g., a Bluetooth™ link) rather than scanning. For example, after a portable scanner makes a Bluetooth™ connection with a computer, the computer may use the Bluetooth connection to communicate the communication session identifier to the scanner, rather than displaying it on the computer display for the user to scan with the portable scanner.

In some embodiments, the system enhances the user interface for portable electronic devices by associating other devices that have better video or audio capability than the portable electronic device. For example, a subscriber waiting for a flight in an airport may browse a television guide and notice a show that he wishes to watch. Using the web browser on his computer to browse to the service provider's website, the subscriber may get a communication session identifier communicated to his laptop computer. Scanning the communication session identifier and information identifying the show from the television guide, the subscriber identifies the laptop computer as the location where he wishes to have the video content (the television show) delivered. The system may check whether the subscriber has the proper permissions to access the content (e.g., does he have a 'cable television' service contract; if broadband Internet access is necessary to deliver the video, does he have a broadband service contract with an Internet Service Provider, etc.) prior to sending it to the laptop computer.

Those having skill in the art will appreciate that there are various vehicles by which processes and/or systems described herein can be effected (e.g., hardware, software, and/or firmware, collectively, logic), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter subject matter described herein, may be implemented via forms of logic including Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented using forms of logic including integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by logic including a wide range of hardware, software, firmware, or any combination thereof which can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. Although many of the embodiments have been described in the context of a portable scanner, one of ordinary skill in the art understands that any portable electronic device having imaging capability may be suitable to implement the disclosed innovations.

We claim:
1. A method comprising:
    receiving, by a content retriever, scanned information comprising: (i) an identifier of a scanner device and (ii) additional information for locating content;
    locating, by the content retriever, the content based at least on the additional information;
    making a determination, by the content retriever, that a candidate device can perform the content by at least:
        determining locations of the scanner device and a second device; and
        selecting the candidate device from among the scanner device and the second device based at least on the locations of the scanner device and the second device; and
    providing, by the content retriever, the content to the candidate device.

2. The method of claim 1, wherein the scanned information comprises information scanned by the scanner device.

3. The method of claim 1, wherein making the determination, by the content retriever, that the candidate device can perform the content further comprises:
    maintaining a device database comprising location information for the scanner device and a plurality of devices, wherein the plurality of devices includes the second device.

4. The method of claim 1, wherein providing, by the content retriever device, the content to the candidate device further comprises providing the content from a network to the candidate device.

5. The method of claim 1, wherein making the determination, by the content retriever, that the candidate device can perform the content further comprises examining characteristics of the content and determining that the candidate device can perform the content.

6. The method of claim 1, wherein the content comprises at least one of: text, digital sound, music, one or more digital images, a video, an electronic document of the scanned information, digital music associated with the scanned information, a digital voice recording, audio news, and audio product information.

7. A method comprising:
    receiving, by a content retriever, scanned information comprising: (i) an identifier of a scanner device and (ii) additional information for locating content;
    locating, by the content retriever, the content based at least on the additional information;
    making a determination, by the content retriever, that the scanner device cannot perform the content;
    selecting, by the content retriever, an associated device based at least on the scanned information by at least;
        determining locations of the scanner device and a second device, and
        selecting the associated device based at least on the locations of the scanner device and the second device; and
    providing, by the content retriever, the content to the associated device.

8. The method of claim 7, wherein the scanned information comprises information scanned by the scanner device.

9. The method of claim 7, wherein selecting, by the content retriever, the associated device based at least on the scanned information further comprises:
    maintaining a device database comprising location information for the scanner device and a plurality of devices, wherein the plurality of devices includes the second device.

10. The method of claim 7, wherein providing, by the content retriever device, the content to the associated device further comprises providing the content from a network to the associated device.

11. The method of claim 7, wherein selecting the associated device based at least on the scanned information comprises examining characteristics of the content and determining that the associated device can perform the content.

12. The method of claim 7, wherein the content comprises at least one of: text, digital sound, music, one or more digital images, a video, an electronic document of the scanned information, digital music associated with the scanned information, a digital voice recording, audio news, and audio product information.

13. A computing system comprising:
a processor; and
a data storage device comprising program instructions that, if executed by the processor, cause the processor to:
receive scanned information comprising: (i) an identifier of a scanner device and (ii) additional information for locating content;
locate the content based at least on the additional information;
make a determination that a candidate device can perform the content by at least:
determining locations of the scanner device and a second device and
selecting the candidate device from among the scanner device and the second device based at least on the locations of the scanner device and the second device; and
provide the content to the candidate device.

14. The computing system of claim 13, wherein the scanned information comprises information scanned by the scanner device.

15. The computing system of claim 13, wherein to make the determination that the candidate device can perform the content, the program instructions further cause the processor to:
maintain a device database comprising location information for the scanner device and a plurality of devices, wherein the plurality of devices includes the device.

16. The computing system of claim 13, wherein to provide the content to the candidate device, the program instructions further cause the processor to provide the content from a network to the candidate device.

17. The computing system of claim 13, wherein to make the determination that the candidate device can perform the content, the program instructions further cause the processor to examine characteristics of the content and determine that the candidate device can perform the content.

18. The computing system of claim 13, wherein the content comprises at least one of: text, digital sound, music, one or more digital images, a video, an electronic document of the scanned information, digital music associated with the scanned information, a digital voice recording, audio news, and audio product information.

* * * * *

UNITED STATES PATENT AND TRADEMARK OFFICE
CERTIFICATE OF CORRECTION

| | | |
|---|---|---|
| PATENT NO. | : 8,531,710 B2 | Page 1 of 1 |
| APPLICATION NO. | : 13/195193 | |
| DATED | : September 10, 2013 | |
| INVENTOR(S) | : Martin T. King et al. | |

It is certified that error appears in the above-identified patent and that said Letters Patent is hereby corrected as shown below:

In the Claims

In Claim 7, Column 14, Line 51, delete "least;" and insert -- least: --, therefor.

Signed and Sealed this
Sixteenth Day of September, 2014

Michelle K. Lee
*Deputy Director of the United States Patent and Trademark Office*